(12) United States Patent
Lawrence

(10) Patent No.: US 11,944,042 B2
(45) Date of Patent: Apr. 2, 2024

(54) GRAIN BIN CONDITIONING SYSTEM USING HEADSPACE AIR

(71) Applicant: AGI SURETRACK LLC, Lenexa, KS (US)

(72) Inventor: Johnselvakumar Lawrence, Hesston, KS (US)

(73) Assignee: AGI SureTrack, LLC, Lenexa, KS (US)

( * ) Notice: Subject to any disclaimer, the term of this patent is extended or adjusted under 35 U.S.C. 154(b) by 0 days.

(21) Appl. No.: 18/321,459

(22) Filed: May 22, 2023

(65) Prior Publication Data
US 2024/0008415 A1    Jan. 11, 2024

Related U.S. Application Data

(63) Continuation of application No. 17/811,791, filed on Jul. 11, 2022, now Pat. No. 11,653,600.

(51) Int. Cl.
*A01F 25/22* (2006.01)

(52) U.S. Cl.
CPC .................................. *A01F 25/22* (2013.01)

(58) Field of Classification Search
CPC .......... A01F 25/22; A01F 25/08; A01F 25/10; B65D 81/263; B65D 81/26; B65D 81/24
USPC ....................................................... 454/182
See application file for complete search history.

(56) References Cited

U.S. PATENT DOCUMENTS

| | | |
|---|---|---|
| 4,142,302 A | 3/1979 | Primus |
| 4,599,809 A | 7/1986 | Parkes |
| 7,818,894 B2 | 10/2010 | Noyes et al. |
| 9,347,904 B1 | 5/2016 | Schaefer, Jr. |
| 9,808,020 B2 | 11/2017 | Johnson et al. |
| 9,808,021 B2 | 11/2017 | Johnson et al. |
| 9,885,520 B1 | 2/2018 | Abbasi |
| 10,782,069 B2 | 9/2020 | Bloemendaal et al. |
| 2009/0117016 A1 | 5/2009 | Decker et al. |
| 2014/0360045 A1 | 12/2014 | Bartosik et al. |
| 2019/0018378 A1 | 1/2019 | Varikooty et al. |
| 2022/0170696 A1 | 6/2022 | Rogoschewsky et al. |

OTHER PUBLICATIONS

"Moisture Relationships of Plant-based Agricultural Products," ASAE Standards, pp. 17 (1999).

*Primary Examiner* — Mark R Wendell
(74) *Attorney, Agent, or Firm* — Shook, Hardy & Bacon L.L.P.

(57) ABSTRACT

An air conditioning system and methods of use regulate a moisture content of an agricultural product in a grain bin. The system receives headspace air from the headspace of the grain bin, which generally has a higher moisture content than ambient air. The system further receives ambient air and mixes the headspace air and the ambient air into a ratio comprising a target moisture content. The air mixture is provided into a grain bin plenum, where it then permeates through to agricultural product, thereby regulating the moisture. The system and method can be used to bring the agricultural product to a target moisture content that is preferred when storing the agricultural product.

20 Claims, 5 Drawing Sheets

GRAIN BIN CONDITIONING SYSTEM USING HEADSPACE AIR

CROSS-REFERENCE TO RELATED APPLICATIONS

This application is a continuation application of U.S. patent application Ser. No. 17/811,791, filed Jul. 11, 2022, entitled "Grain Bin Conditioning System Using Headspace Air," the entirety of which is expressly incorporated by reference in its entirety.

BACKGROUND

Grain bins are commonly used in agriculture to dry and store agricultural products. It is common practice to dry agricultural products to achieve desired safe storage moisture content to avoid mold growth at high harvest moisture content. This has generally been done by introducing heated or unheated ambient air into to grain bins until the desired moisture content is achieved.

SUMMARY

At a high level, the technology described herein relates to regulating the relative humidity of air used for conditioning the moisture content of an agricultural product using an air conditioning system. The air conditioning system receives high relative humidity (RH) headspace air from a headspace of a grain bin and mixes the high RH headspace air with low RH ambient air to get optimum RH for conditioning. The air mixture comprising the headspace air and the ambient air is mixed to achieve a target relative humidity level, where the target relative humidity level better regulates the moisture content of the agricultural product to help prevent over or under drying.

To do so, a controller modifies a valve that controls the amount of headspace air receiving into a mixer through the headspace air through a headspace air supply line. The controller modifies a valve that controls the amount of ambient air receiving into the mixer through the ambient air through an ambient air supply line. An air mixture comprising the received high RH headspace air and the received low RH ambient air comprises a relative humidity level that is equal to a target relative humidity level that depends on the grain type. The air mixture having the target relative humidity level is provided to a grain bin plenum to permeate through the agricultural product to regulate the agricultural product's moisture content.

This summary is intended to introduce a selection of concepts in a simplified form that are further described below in the detailed description section of this disclosure. This summary is not intended to identify key or essential features of the claimed subject matter, nor is it intended to be an aid in determining the scope of the claimed subject matter.

Additional objects, advantages, and novel features of the technology will be set forth in part in the description that follows, and in part, will become apparent to those skilled in the art upon examination of the following or learned by practice of the technology.

BRIEF DESCRIPTION OF THE DRAWINGS

The present technology is described in detail below with reference to the attached drawing figures, wherein.

DETAILED DESCRIPTION

Figure 1:
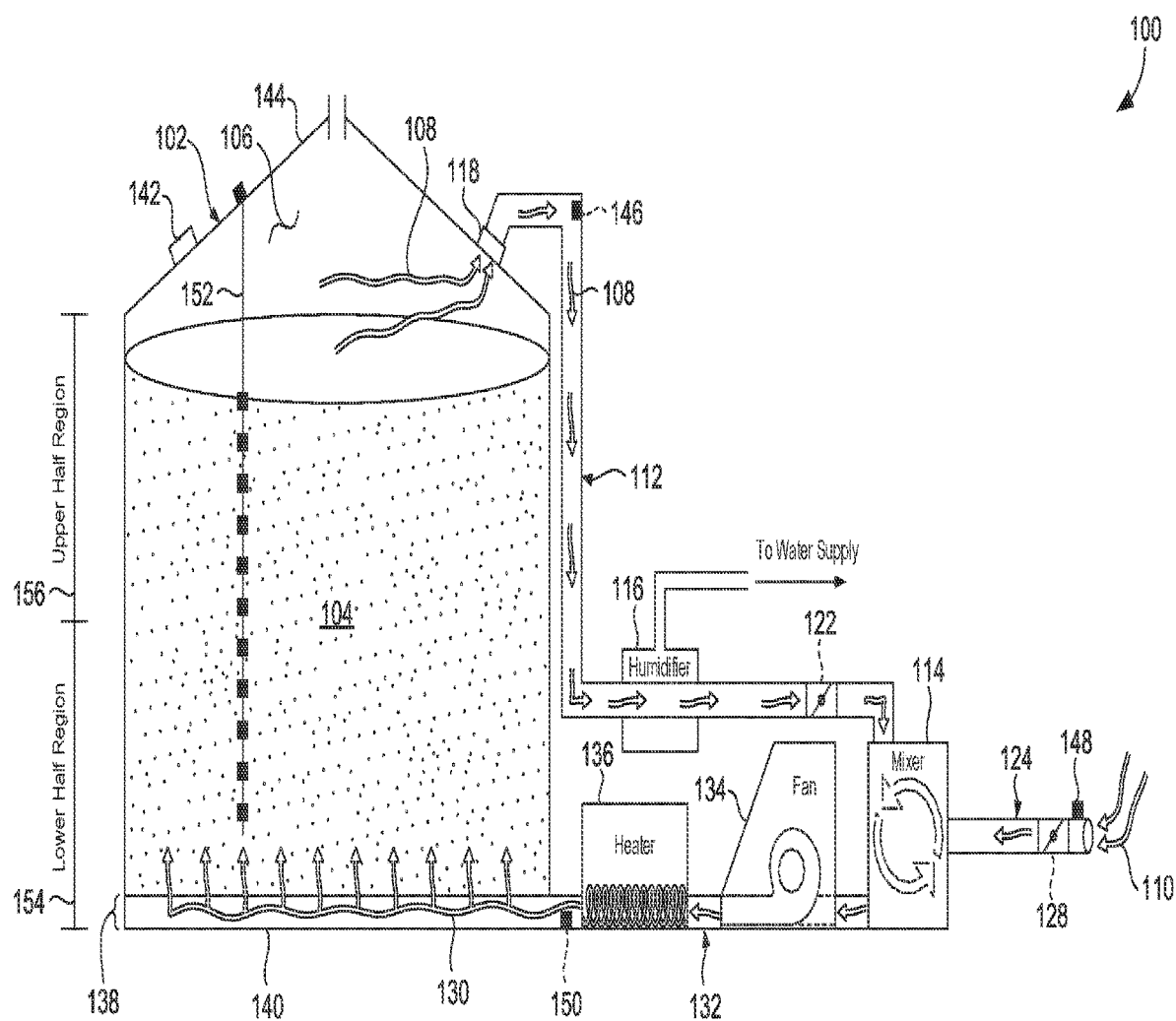
FIG. 1 is an example air conditioning system for regulating moisture content of an agricultural product in a grain bin, in accordance with an embodiment described herein.

Moving natural air into an agricultural product stored in a grain bin is a common method used to condition agricultural product. Agricultural product regulation can include processes such as drying, rehydrating, cooling, warming, and the like. A common term used for drying agricultural products in a grain bin is "in-bin natural air drying" (NAD).

As an example, corn is a type of agricultural product dried using in-bin NAD. Corn is harvested at a moisture content range of around 18-22% and dried to safe storage moisture of about 15%. In a typical natural air conditioning system, ambient air is pumped into a plenum of the grain bin, where ambient air then flows through the corn. The ambient air carries out moisture from the corn, and into to the headspace, where the now moist air exits via vents in the grain bin. Normally, three zones in the grain mass during NAD can be identified: a dried zone, a drying zone, and a wet zone.

NAD or Natural Air Hydration (NAH) typically uses ambient air for drying and rehydration, or for other condition processes. Generally, drying is done to bring high harvest moisture to safe storage moisture, which is around 65% relative humidity (RH). Rehydration is done to bring overdried product to a marketable safe moisture. The temperature and RH of the ambient air fluctuate throughout the day and night. That is, in one day, only some hours have good conditioned air for drying, while other hours have good conditioned air for hydrating.

Conventionally, fans are turned on when there is good conditioned air to move it through into the agricultural product in the grain bin. One of the current problems with automatic bin management system strategies is that, once the bottom layer reaches a target moisture content, an operational time window based on air relative humidity is narrowed down to avoid over-drying of bottom layer, since systems generally require the ambient air to reach a temperature and relative humidity level that is considered good conditioned air for drying, rehydrating, and so forth.

As a result, some automatic bin management systems that control the air conditioning process do not operate during hydrating hours (unproductive air) for drying or during drying hours (unproductive air) for hydrating. The operational window of time is particularly narrow once a bottom layer of the agricultural product reaches a target moisture content. To minimize over-drying or over-wetting the bottom layer, the operational time in which ambient air can be used is fairly limited. This period depends on the local weather in that location.

The present technology offers improvements over the existing systems by mixing headspace air from the grain bin, which generally has a high relative humidity compared to the plenum air, with the ambient air to achieve a target RH or the equilibrium moisture content (EMC) level for the mixed air, which is then provided into the grain bin for conditioning the agricultural product. By mixing the headspace air in various ratios with the ambient air, the operational time in which good conditioned air can be provided to the agricultural product within the grain bin is prolonged. This ultimately allows more runtime for the system, thus reducing the time it takes to condition the agricultural product as desired, while at the same time, reducing the risk of over-drying or over-wetting parts of the agricultural product nearest the grain bin plenum where the air is introduced.

To achieve these benefits, an air conditioning system is provided that mixes headspace air from the grain bin or high RH air from humidifier (separate water source) with low RH ambient air. The system comprises a headspace air supply line that receives headsp ace air from the grain bin headspace and moves the air through the headspace air supply line into a mixer. Additionally, if the headspace air RH is low, high RH air gets from the humidifier attached to the water source. An ambient air supply line receives ambient air relative to the grain bin, e.g., from any air source external from the grain bin, such as natural air. The ambient air supply line moves the ambient air into the mixer. In one embodiment, both the headspace air and ambient air are respectively drawn through the headspace air supply line and an ambient air supply line by way of a fan.

The mixer provides a space where the headspace air and the ambient air are mixed. The ratio of the amount of headspace air and ambient air being mixed can be determined by a controller, which operationally controls a headspace air valve and an ambient air valve. In turn, this respectively adjusts a headspace airflow rate and an ambient airflow rate, thus controlling the ratio of headspace air and ambient air entering the mixer. The ratio can be determined so that the mixed air achieves a target RH level. The target RH level can be determined based on the type of agricultural product in the grain bin and the target moisture content of the agricultural product, which is to be achieved or maintained. Once mixed, a fan can blow the air mixture into a plenum of the grain bin so that it moves through and conditions the agricultural product.

It will be realized that the systems previously described are only examples that can be practiced from the description that follows, and it is provided to more easily understand the technology and recognize its benefits. Additional examples are now described with reference to the figures.

Turning now to FIG. 1, FIG. 1 provides an example air conditioning system 100 for use with grain bin 102 to condition agricultural product 104 stored within grain bin 102. FIG. 1 provides for a cross-sectional view of grain bin 102. In general, a grain bin, such as grain bin 102, may be any area suitable for storing an agricultural product, such as agricultural product 104. Among other storage systems, this can include silos, elevators, storage containers, trench silos, and so forth. Agricultural products may be any product of agriculture, such as wheat, corn, soybeans, rice, legumes, nuts, barley and so forth.

As illustrated in FIG. 1, grain bin 102 comprises headspace 106. Headspace 106 may comprise an area within grain bin 102 above agricultural product 104 stored within grain bin 102.

Under some conditions, headspace air 108 within headspace has a RH level that is greater than a RH level of ambient air 110. This is generally due to the air within grain bin 102 picking up more moisture as it permeates through agricultural product 104 and enters headspace 106.

In FIG. 1, air conditioning system 100 comprises headspace air supply line 112. Headspace air supply line 112 generally facilitates the movement of headspace air 108 from headspace 106 to mixer 114. Headspace air supply line 112 can be formed, at least in part, of a series of ductwork through which air can pass.

Headspace air supply line 112 may comprise other components through which headspace air 108 passes en route to mixer 114. In the example illustrated, headspace air 108 passes through humidifier 116 along headspace air supply line 112. Other components in other arrangements are also contemplated.

Headspace air supply line 112 has headspace air receiving end 118. Headspace air receiving end 118 is generally configured to engage grain bin 102. That is headspace air receiving end 118 may comprise a flange or other connection member suitable for engaging grain bin 102. Headspace air receiving end 118 comprises an open end that, when engaged with grain bin 102, provides fluid access from headspace 106 of grain bin 102 to within headspace air supply line 112, such that headspace air 108 can move from within headspace 106 into the open end of headspace air supply line 112 at headspace air receiving end 118 and through headspace air supply line 112 toward mixer 114. In an aspect, headspace air receiving end 118 can be mounted to a roof of grain bin 102.

As noted, various components may be included along headspace air supply line 112 through which headspace air 108 moves. As noted, one particular example arrangement, air conditioning system 100 comprises humidifier 116 along headspace air supply line 112. Humidifier 116 is coupled to a water source and injects water into headspace air 108. When in use, the water injected by humidifier 116 increases the RH level of headspace air 108 received from headspace 106. This may be done, for instance, when the RH of headspace air 108 is lower than a target RH for drying or hydration. Humidifier 116 may be any type of humidifier, including those using evaporative cooling, ultrasonic pulses, vaporizers, and the like. The humidifier injects water into headspace air 108 in the form of vaporized air particles. Other methods of injecting water into headspace air 108 can include providing a wick into headspace air supply line 112, over which headspace air 108 passes. Other types of humidifiers and methods for injecting water will be understood and are contemplated within the scope of this disclosure. While air conditioning system 100 comprises humidifier 116, it will be understood that some arrangements do not include humidifier 116. Humidifier 116 may be optionally included or operated based on the weather parameters in a particular location.

Headspace air supply line 112 also comprises headspace air valve 122. Headspace air valve 122, as illustrated, is within headspace air supply line 112 and generally regulates entry of headspace air 108 into mixer 114. Headspace air valve 122 operates to at least partially or fully open and close headspace air supply line 112, such that, when open, headspace air 108 passes through headspace air supply line 112 to mixer 114. 112. A degree to which headspace air valve 122 is open regulates the rate at which headspace air 108 passes through headspace air supply line 112. Any valve suitable for opening or closing, or at least partially opening or partially closing, headspace air supply line 112 may be used. Some examples that may be suitable for use include gate valves, butterfly valves, ball valves, and so forth.

As shown in FIG. 1, headspace air valve 122 is positioned along headspace air supply line 112 between mixer 114 and humidifier 116. However, it will be understood that the arrangement illustrated is only an example, and that other arrangements are contemplated. In general, headspace air valve 122 may be positioned at any location along headspace air supply line 112.

As shown in FIG. 1, air conditioning system 100 further comprises ambient air supply line 124. In general, ambient air supply line 124 facilitates moving ambient air 110 into mixer 114. Ambient air supply line 124 can be formed, at least in part, of a series of ductwork through which ambient air 110 can pass.

As illustrated, ambient air supply line 124 may also comprise various components through which ambient air 110 may pass as ambient air 110 is moved into mixer 114. In the example illustrated, ambient air supply line 124 further comprises ambient air valve 128. Other components in other arrangements are also contemplated.

In general, ambient air supply line 124 may move ambient air 110 to mixer 114. Ambient air 110 can comprise any air received from an area external to grain bin 102. For instance, ambient air 110 may be natural air surrounding grain bin 102; a specific mixture of air received from an air storage container or generator, such as air comprising any one or more of nitrogen, oxygen, carbon dioxide, argon, water vapor, and the like; or another like source.

Ambient air supply line 124 is illustrated as comprising ambient air valve 128, which generally regulates entry of ambient air 110 into mixer 114. Ambient air valve 128 operates to at least partially or fully open and close ambient air supply line 124, such that, when open, ambient air 110 passes through ambient air supply line 124 to mixer 114. A degree to which ambient air valve 128 is open regulates the rate at which ambient air 110 passes through ambient air supply line 124. Any valve suitable for opening or closing, or at least partially opening or partially closing, ambient air supply line 124 may be used. Some examples that may be suitable for use include gate valves, butterfly valves, ball valves, and so forth. While the ambient air valve 128 is illustrated at a particular location along ambient air supply line 124, other arrangements are contemplated.

As noted, headspace air supply line 112 facilitates delivering headspace air 108 to mixer 114 and ambient air supply line 124 facilitates delivering ambient air 110 to mixer 114. Generally, mixer 114 provides a mixing area where headspace air 108 is mixed with ambient air 110. While illustrated as an individual component, mixer 114 is intended to be any location or mechanism by which headspace air 108 and ambient air 110 are mixed. Mixer 114 may be a standalone component, may be integrated with any other component, or may be a location where headspace air supply line 112 and ambient air supply line 124 join. At mixer 114, headspace air 108 is mixed with ambient air 110 to form air mixture 130.

Air mixture 130, comprising a mixture of headspace air 108 and ambient air 110, may be provided back to grain bin 102 through air mixture supply line 132. In general, air mixture supply line 132 comprises ductwork for facilitating moving air mixture 130 from mixer 114 to grain bin 102. Air mixture supply line 132 may comprise other components through which air mixture 130 passes when moving from mixer 114 to grain bin 102. In the example illustrated, air conditioning system 100 comprises fan 134 and heater 136 along air mixture supply line 132. Other components in other arrangements are also contemplated.

Fan 134, as illustrated, is generally configured to receive air mixture 130 from mixer 114 and move air mixture 130 through air mixture supply line 132 toward grain bin 102. In another arrangement, fan 134 is configured to receive headspace air 108 from headspace air supply line 112 and ambient air 110 from ambient air supply line 124, facilitate mixing of headspace air 108 and ambient air 110, and move air mixture 130 through air mixture supply line 132. In general, fan 134 may comprises a fan system for moving air mixture 130. For instance, axial, centrifugal, mixed flow, including bladed and bladeless fans, and the like fan systems can be used. In some embodiments, fan 134 receives air mixture 130 from mixer 114 and pushes it through air mixture supply line 132 toward grain bin 102. In a specific embodiment, fan 134 receives only air mixture 130 having been mixed at mixer 114.

Air conditioning system 100 is further illustrated as comprising heater 136. Heater 136 is illustrated and described as a discrete component. However, as with other components described in relation to air conditioning system 100, heater 136 may be combined with other components. As an example, fan 134 and heater 136 could also be illustrated and described as a single component. Moreover, while heater 136 is illustrated along air mixture supply line 132, disposed between fan 134 and grain bin 102, this is just one example, and other arrangements of heater 136 and fan 134, whether provided as a single component or separate components, may be used in implementations of the disclosed technology.

In general, heater 136 heats air mixture 130 as it is passed through air mixture supply line 132. By heating air mixture 130, an RH level of air mixture 130 can be decreased or otherwise controlled to adjust the RH level to a target RH level. Heater 136 may use any type of heating element or mechanism suitable for increasing a temperature, and thereby reducing the RH level, of air mixture 130. For instance, heaters using electric heating coils, or other resistance heating methods; gas, such as methane, propane, butane, mixtures thereof, and so forth; or other like heating methods, may be used by heater 136 to heat air mixture 130. Air mixture 130 can be passed through a portion of air mixture supply line 132 corresponding to heater 136, such that air mixture 130 is heated from a first temperature to a second temperature, where the second temperature corresponds to air mixture 130 having an RH level about equal to or equal to the target RH level for air mixture 130. The target RH level may be calculated based on the equilibrium moisture content (EMC) characteristics of the particular agricultural product in grain bin 102.

Air mixture supply line 132, as illustrated, opens into grain bin plenum 138. Grain bin plenum 138 generally comprises a location at which air mixture 130 is received from air mixture supply line 132 into grain bin 102 and is dispersed through the agricultural product 104 by passing through a perforated opening of grain bin plenum 138, such that air mixture 130 conditions agricultural product 104 in a desired manner.

In the example illustrated, air mixture 130 is provided within grain bin plenum 138 at a location corresponding to base 140 of grain bin 102. Base 140 may correspond to a lowermost portion of grain bin 102. In example system illustrated, grain bin plenum 138 is provided within grain bin 102 at a location corresponding to base 140. This example arrangement provides benefits in that air mixture 130 is blown into grain bin plenum 138 and is forced upward into agricultural product 104, thereby permeating agricultural product 104, and out of one or more grin vents, such as grain bin vent 146 located on grain bin roof 144, which may correspond to an uppermost portion of grain bin 102 opposite that of grain bin base 140. In doing so, the moisture content of agricultural product 104 can be increased or decreased based on the RH level of air mixture 130. In this way, the technology described herein allows for greater control in adjusting the moisture content of agricultural product 104, compared to existing methods, since there is greater control over the RH level of air mixture 130. This, in turn, provides for better moisture content control of agricultural product 104, thereby reducing over drying or over wetting during conditioning.

In some cases, to determine or control the RH levels of headspace air 108, ambient air 110, or air mixture 130, one or more sensors may be provided as part of air conditioning system 100. In the example illustrated, air conditioning system 100 comprises first sensor 146, second sensor 148, and third sensor 150. In a specific implementation, sensors, such as first sensor 146, second sensor 148 and third sensor 150 measure RH. It will be understood that sensors may also be used to measure other variables, such as temperature, airflow rate, air pressure, and so forth. Sensors suitable for use are generally known in the field. Some suitable examples include those utilized by the Automated Grain Bin Monitoring and Conditioning System (BinManager®) offered by AGI SureTrack®.

First sensor 146, as used in the example air conditioning system 100, is disposed within headspace air supply line 112, such that first sensor 146 measures at least a first RH level of headspace air 108, or any other variable associated with headspace air 108. While shown within headspace air supply line 112, first sensor 146 could be positioned within headspace 106 of grain bin 102 to measure the first RH level of headspace air 108.

Second sensor 148, as used in the example air conditioning system 100, is positioned at a location outside of grain bin 102, such that second sensor 148 measures at least a second RH level of ambient air 110, or any other variable associated with ambient air 110. Second sensor 148 may be positioned on or within ambient air supply line 124, as illustrated, or at any other location outside of grain bin 102. In another example embodiment, second RH level of ambient air 110 is received from another source, such as a third-party weather source through network communications, as will be further discussed. This may be performed in addition to or in lieu of using second sensor 148.

Third sensor 150, as used in the example air conditioning system 100, is positioned within air mixture supply line 132, such that third sensor 150 measures at least a third RH level of air mixture 130, or any other variable associated with air mixture 130.

As with other components, sensors may be stand-alone sensors, or may be integrated with other components. For instance, any of the sensors may be integrated with humidifier 116, mixer 114, fan 134, heater 136, or any other component. While shown within air mixture supply line 132, disposed between heater 136 and grain bin 102, third sensor 150 could be positioned at any location along air mixture supply line 132. In a particular embodiment, third sensor 150 is positioned within grain bin plenum 138. For instance, one location suitable for third sensor 150 includes a location within grain bin plenum 138 corresponding to an opening of air mixture supply line 132, such that third sensor 150 measures RH, or other variables, of air mixture 130 as it exits air mixture supply line 132 and enters grain bin plenum 138.

Among other example components, air conditioning system 100 comprises sensor cable 152. Sensor cable 152 comprises one or more sensors suspended through agricultural product 104. Such sensors may measure, temperature, RH, carbon dioxide, and the like. That is, each sensor of sensor cable 152 measures a variable at a different vertical location within agricultural product 104, as it is stored within grain bin 102. Sensor cables measuring temperature and RH levels, which can be used to determine a moisture content of an agricultural product, are known in the art. One suitable example is also provided by BinManager® offered by AGI SureTrack®. This system can be used to determine a moisture content at different vertical positions within agricultural product 104 using the temperature and RH sensors provided by the BinManager® temperature and RH sensor cables.

It is again noted that air conditioning system 100 is one example suitable of the technology, and one that is suitable for use in implementing methods of conditioning stored agricultural products that will be further described. Other arrangements and systems are contemplated, and the example illustrated in FIG. 1 is not intended to limit the technology to a particular arrangement. In other embodiments, more or fewer components may be used. Components shown and illustrated in FIG. 1, along with other components that may be present in other embodiments, can be standalone components performing the individual functions described herein, or may be integrated within one or more of the illustrated or additional components to perform the described tasks.

As discussed, air conditioning system 100 may be used to condition an agricultural product for storage or sale. For example, air conditioning system 100 may condition air to have particular target temperatures or RH levels, and then moves the conditioned air across a stored agricultural product, such as stored agricultural product 104, in an effort to bring the agricultural product to a particular moisture content, or have another desired property.

To do so, agricultural product 104 can be provided to and housed within grain bin 102, as illustrated. As noted, there are generally different target moisture contents desired depending on an agricultural product type. Some moisture contents are better for long-term storage, while others are targeted prior to sale. Thus, the target moisture content may be determined based on the agricultural product type and the current stage of the agricultural product within the overall supply chain.

Table 1 provides some example agricultural product types, along with target moisture content for each type. Table 1 includes examples for a short-term (about 6 months) storage.

TABLE 1

| Agricultural Product | Target Moisture Content (Storage) |
|---|---|
| Wheat | 14.0% |
| Corn | 15.0% |
| Soybean | 13.0% |
| Popcorn | 13.5% |
| Rice | 13.0% |
| Barley | 14.0% |
| Oats | 14.0% |
| Sorghum | 15.0% |

TABLE 1-continued

| Agricultural Product | Target Moisture Content (Storage) |
|---|---|
| Sunflower | 10% |
| Edible beans | 16% |

To bring agricultural product 104 to a target moisture content, a current moisture content can be determined for various vertical levels of agricultural product 104 using sensor cable 152. In general, when relatively dryer air is blown into grain bin plenum 138, lower levels of agricultural product 104, such as a portion of agricultural product 104 within lower one-half region 154 of grain bin 102, tend to dry faster than a portion of agricultural product 104 within the upper one-half region 156 of grain bin 102.

To better control the condition of agricultural product 104 during conditioning (such as drying or wetting), a target RH level, which can be based on the target moisture content or the current moisture content of agricultural product 104, for air mixture 130 can be achieved, and air mixture 130 is blown into and permeated through agricultural product 104.

As an example, some target RH levels for air mixture 130 that may be used based on the target moisture content of agricultural product 104 comprise a target mixed air RH level in a range from about 60% to about 70%. In a specific case, the target mixed RH level is equal to or between 60% and 70% RH. Target agricultural product temperature may comprise a range from about 40.0° F. (4.4° C.) to about 60.0° F. (16.6° C.). In a specific case, the target agricultural product temperature may comprise a range from equal to or between 40.0° F. (4.4° C.) and 60.0° F. (16.6° C.). It will be understood that hybrids of some the various agricultural types may have different optimal moisture contents for storage, and therefore, these values are intended to be a representative example.

In operation, the target RH level for air mixture 130 may be determined using an equation for equilibrium moisture content (EMC) characteristics. To achieve the determined target RH level, headspace air 108 from headspace 106 may be drawn into headspace air supply line 112. As noted, headspace air 108 will typically have an RH level greater than the RH level of ambient air 110 as moisture is released into headspace air 108 from agricultural product 104. Headspace air 108 is moved through headspace air supply line 112 to mixer 114. Specific values for ranges provided in target air mixture ranges, including target relative humidity, can be calculated using the following:

$$ERH = \exp\left[-\frac{A}{T+C}\exp(-B \times MC_D)\right]$$
$$MC_D = \frac{1}{B} \times \ln\left[-\frac{A}{(T+C) \times \ln(ERH)}\right]$$

RH is relative humidity
T is temperature
$MC_D$ is dry-basis moisture content
A.B.C are constants A, B, C are isotherm equation constants for agricultural products, which are based on the specific agricultural product. Such values will be known and accessible to those of ordinary skill in the art. As an example, some can be found in "Moisture Relationships of Plant-based Agricultural Products," ASAE D245.5, October 1995, which is incorporated by reference herein in its entirety.

If RH levels for headspace air 108 are lower than the target RH level, then the RH level of headspace air 108 can be increased to any level using humidifier 116. In the example illustrated, humidifier 116 is located along headspace air supply line 112. While other arrangements are possible, this arrangement has benefits because humidifier 116 can be more efficient when increasing RH levels of headspace air 108, since there is already a relatively greater amount of water vapor in headspace air 108, and since RH levels of headspace air 108 are generally greater than that of ambient air 110. This can conserve water resources and increase the working life of humidifier 116.

Further, ambient air 110 can be drawn into ambient air supply line 124. Ambient air 110 is moved through ambient air supply line 124 and into mixer 114, where it is mixed with headspace air 108 to form air mixture 130. Air mixture 130 can be formed such that air mixture 130 comprises the target RH level.

Headspace air 108 and ambient air 110 can be mixed at a specific ratio to form air mixture 130 comprising the target RH level. The amount of headspace air 108 is adjusted by adjusting the headspace airflow rate by modifying the degree to which headspace air valve 122 is open. Likewise, the amount of ambient air 110 is modified by adjusting an ambient airflow rate by modifying the degree to which ambient air valve 128 is open. The flow rates can be adjusted to achieve a ratio of headspace air 108 to ambient air 110, such that, when mixed, air mixture 130 comprises the target flow rate.

One method of determining the ratio comprises measuring, using first sensor 146, a first RH level of headspace air 108, and measuring, using second sensor 148, a second RH level of ambient air 110. The current RH level of air mixture 130, as measured by third sensor 150, is adjusted to achieve the target RH level. For instance, if the current RH level is less than the target RH level, the headspace airflow rate is increased relative to the ambient airflow rate until the target RH level of air mixture 130 is achieved. Conversely, if the current RH level is greater than the target RH level, the headspace airflow rate is decreased relative to the ambient airflow rate until the target RH level of air mixture 130 is achieved.

If the RH of ambient air 110 is greater than the target RH, heater 136 is operated to bring the RH of ambient air 110 down to the target RH. If the RH of headspace air 108 is lower than the target RH, then humidifier 116 can be operated to include the RH of headspace air 108 to the target RH.

Target RH may be determined by taking into account the heat of compression (fan warm) at the plenum. For example, as a rule of thumb 1 in. (inch) of water (249.09 Pascal) static pressure developed in the plenum develop 1° F. temperature rise. The target RH can be determined using a psychrometric equation. In the beginning, plenum RH is calculated based on predicted temperature value and is observed whether it is achieved or not within 30 min of fan running and re-adjust the calculation based on measured temperature rise. For conversion purposes, 1 in. of water column pressure=249.09 Pascal pressure. Moreover, C=5/9×(F−32). However, more specific measurements can be determined using PV=nRT, where P is the pressure at the grain plenum, V is the volume plenum, n=number of mol of gas in the plenum, R is the gas constant equal to 8.31 J/Kmol, and T is the temperature of the gas in the plenum.

If the target RH level is greater than the first RH level of headspace air 108 and the second RH level of ambient air 110, then air conditioning system 100 may only receive headspace air 108 from headspace 106. Humidifier 116 can be used to increase the first RH level to the target level by injecting water into headspace air 108 as it flows through headspace air supply line 112. The target RH level can be achieved by measuring, using third sensor 150, the current RH level of air mixture 130, and increasing the amount of water injected into headspace air 108 until the current RH level increases to equal the target RH level.

If the target RH level is lower than headspace air 108 and ambient air 110, then air conditioning system 100 may only receive ambient air 110. Heater 136 can be used to decrease the current RH level of air mixture 130. Heater 136 can be used to increase the temperature of air mixture 130 until the current RH level, as measured by third sensor 150, decreases to equal the target RH level. It may also take into account the heat of compression.

As noted, the target RH level of air mixture 130 can be determined by a target moisture content of agricultural product 104 and a current moisture content of agricultural product 104. Thus, the target RH level is based on the target moisture content or the current moisture content of agricultural product 104. Further, this target RH level may be based on a specific portion of the agricultural product, such as a portion of the agricultural product within lower one-half region 154 of grain bin 102.

While the target RH level may be based on the moisture content of agricultural product 104, one particular example suitable for some uses of the technology comprises a target RH level, of air mixture 130, in a range from about 55% to about 65% RH. In a specific case, the target RH level, of air mixture 130, is in a range from 55% to 65%. In another specific case, the target RH level of air mixture 130 is about 65% or is 65%

Once air mixture 130 comprises the target RH level, air mixture 130 can be provided to grain bin 102. For instance, air mixture 130 can be provided to grain bin plenum 138 using fan 134. The location where air mixture 130 is provided within grain bin 102 may be within lower one-half region 154 of grain bin 102.

Figure 2:
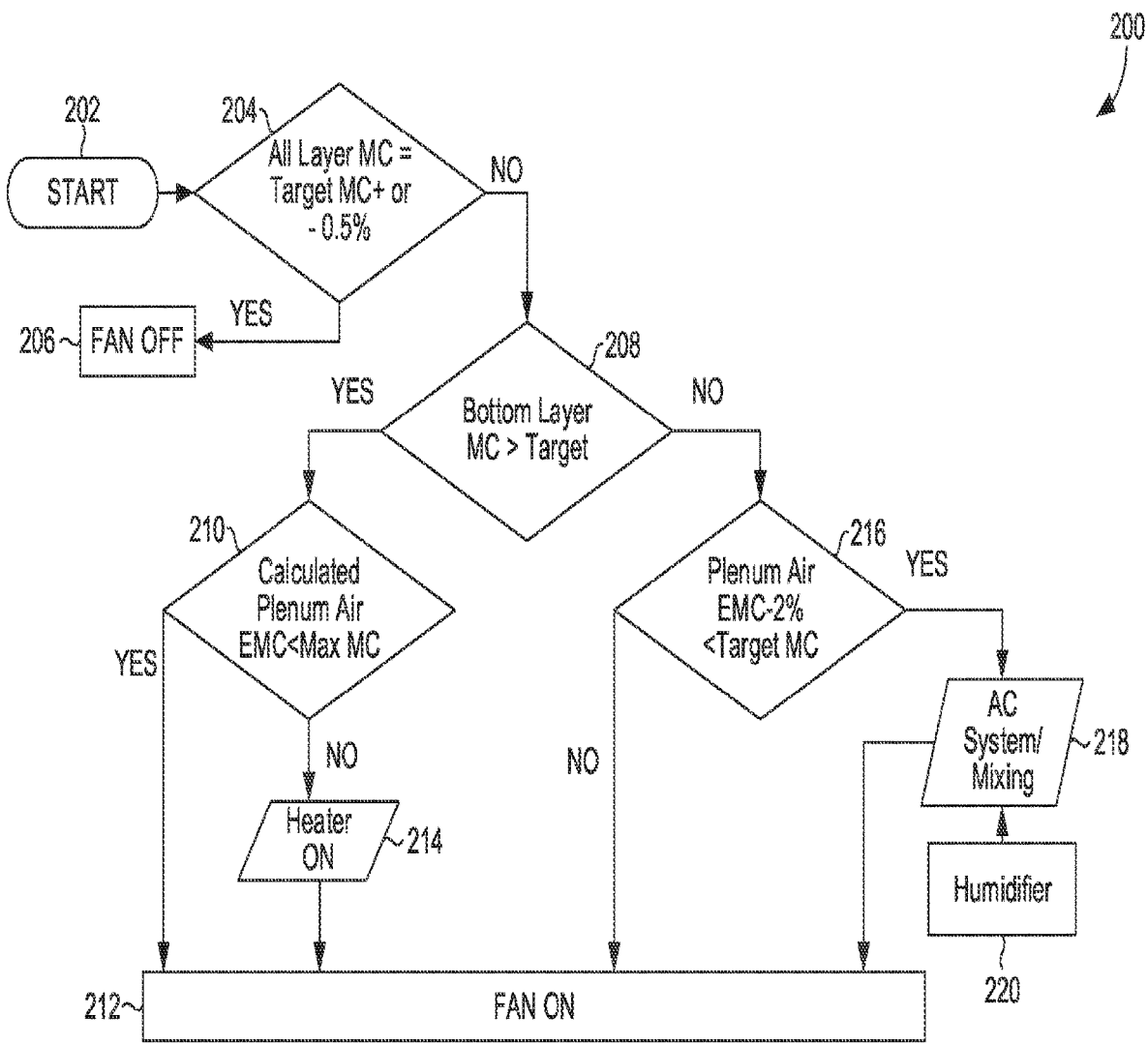
FIG. 2 is an example process of regulating moisture content in an agricultural product stored in a grain bin, which can be performed by the air conditioning system of FIG. 1, in accordance with an aspect described herein.

With reference now to FIG. 2, FIG. 2 provides example process 200 of regulating moisture content in an agricultural product stored in a grain bin. Air conditioning system 100 of FIG. 1 is one suitable system for performing process 200.

Process 200 begins at start 202 and proceeds to step 204. At step 204, a determination is made whether each of the vertical layers of the agricultural product within the grain bin have a moisture content that is equal to the target moisture content, within a predetermined threshold, for the agricultural product. As an example, the system may determine using a cable sensor, such as cable sensor 152, whether the agricultural product has a moisture content equal to within ±0.5% moisture of the target moisture content. If the target moisture content for each of the vertical layers is within the threshold moisture, then process 200 proceeds to step 206, "Fan Off". This shows that drying/hydration is completed. Here, at step 206, the air conditioning system, such as air conditioning system 100, does not blow an air mixture into the grain bin. However, if the target moisture content for each of the vertical layers is not within the threshold moisture, then process 200 proceeds to step 208. This shows that drying/hydration is not completed.

At step 208, it is determined whether a bottom layer of agricultural product has achieved the target moisture content within a predetermined threshold. For instance, it may be determined whether the moisture content is equal to within ±0.5% moisture of the target moisture content. The bottom layer may comprise a vertical layer of agricultural product corresponding to a lowermost sensor on the sensor cable. In some cases, the bottom layer comprises a portion of the agricultural product within a lower one-half region of the grain bin. In an example, a bottle layer comprises a layer of agricultural product corresponding to a location of a lowermost sensor measuring vertical conditions of the agricultural product. If the bottom layer comprises a moisture content within the threshold of the target moisture content, then process 200 proceeds to step 210.

At step 210, a determination is made whether EMC of air in the grain bin plenum is less or greater than a maximum moisture content of the agricultural product in the layers. As noted, the EMC can be determined based on the heat of compression temperature prediction. If YES, process 200 proceeds to step 212 where the fan is turned on to blow ambient air into the grain bin plenum to permeate through the agricultural product. If NO, process 200 proceeds to step 214 wherein the heater of the air conditioning system is engaged to achieve target air EMC less than the maximum moisture content of the agricultural product in the layers. Process 200 then proceeds to step 212 where the air conditioning system fan is turned on to blow ambient air into the grain bin plenum to permeate through the agricultural product.

With reference back to step 208, if the bottom layer comprises a moisture content less than the threshold of the target moisture content, then process 200 proceeds to step 216. At step 216, a determination is made whether the EMC of air minus 2% in the grain bin plenum is less than a target moisture content of the agricultural product. If not, then process 200 proceeds to step 212 where the air conditioning system fan is turned on to blow ambient air into the grain bin plenum to permeate through the agricultural product. However, if the EMC of air minus 2% in the grain bin plenum is less than the target moisture content, then the air conditioning system mixes the headspace air with the ambient air to achieve the target RH level at step 218. If the RH of the headspace air is lower than the target RH level, then the RH level of the air mixture is increased using the humidifier at step 220 The process then proceeds to step 212 where the fan is turned on, which blows the air mixture into the grain bin plenum where it permeates through the agricultural product.

In many cases, an air conditioning system, such as air conditioning system 100 of FIG. 1, performs operations under the direction of computer-executable instructions. That is, one or more of the components of air conditioning systems describe herein may be operated under the guidance of a controller. For instance, air conditioning systems, such as air conditioning system 100, may autonomously or semi-autonomously operate to condition air for an agricultural product based on computer instructions being executed by a computing device, such as the controller.

Figure 3:
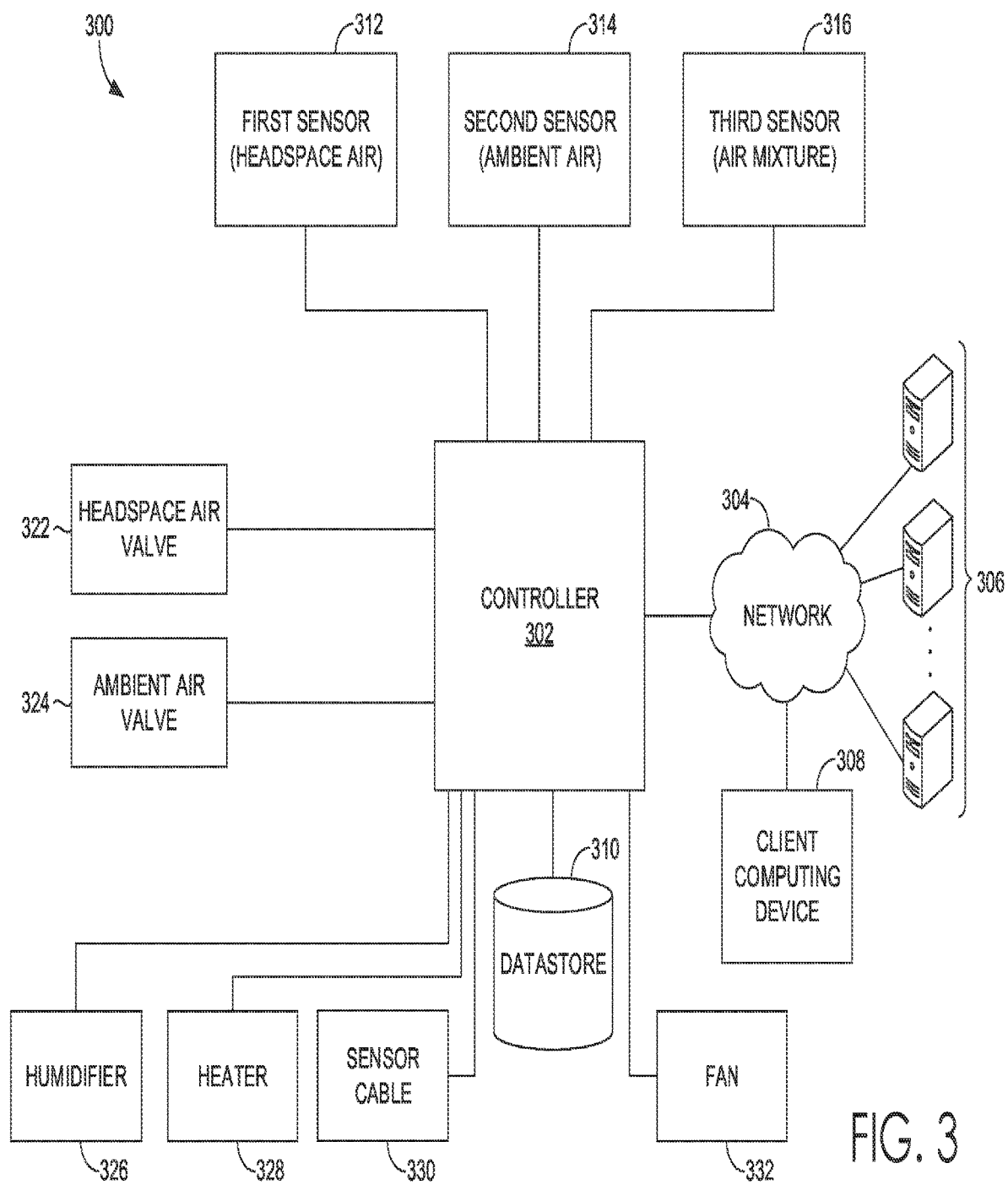
FIG. 3 is an example operating environment for a controller suitable for instructing components of the air conditioning system of FIG. 1 to perform operations, in accordance with an embodiment described herein.

FIG. 3 provides an example operating environment for an example controller 302 suitable for use with air conditioning systems described herein, such as air conditioning system 100 of FIG. 1. Thus, some components described with respect to FIG. 3 may correspond to, and are illustrative examples of, those components described in conjunction with air conditioning system 100 of FIG. 1.

In general, controller 302 is a computing device configured to operationally control one or more components of an air conditioning system. With brief reference to FIG. 4, FIG. 4 illustrates an example computing device suitable for use as controller 302.

Figure 4:
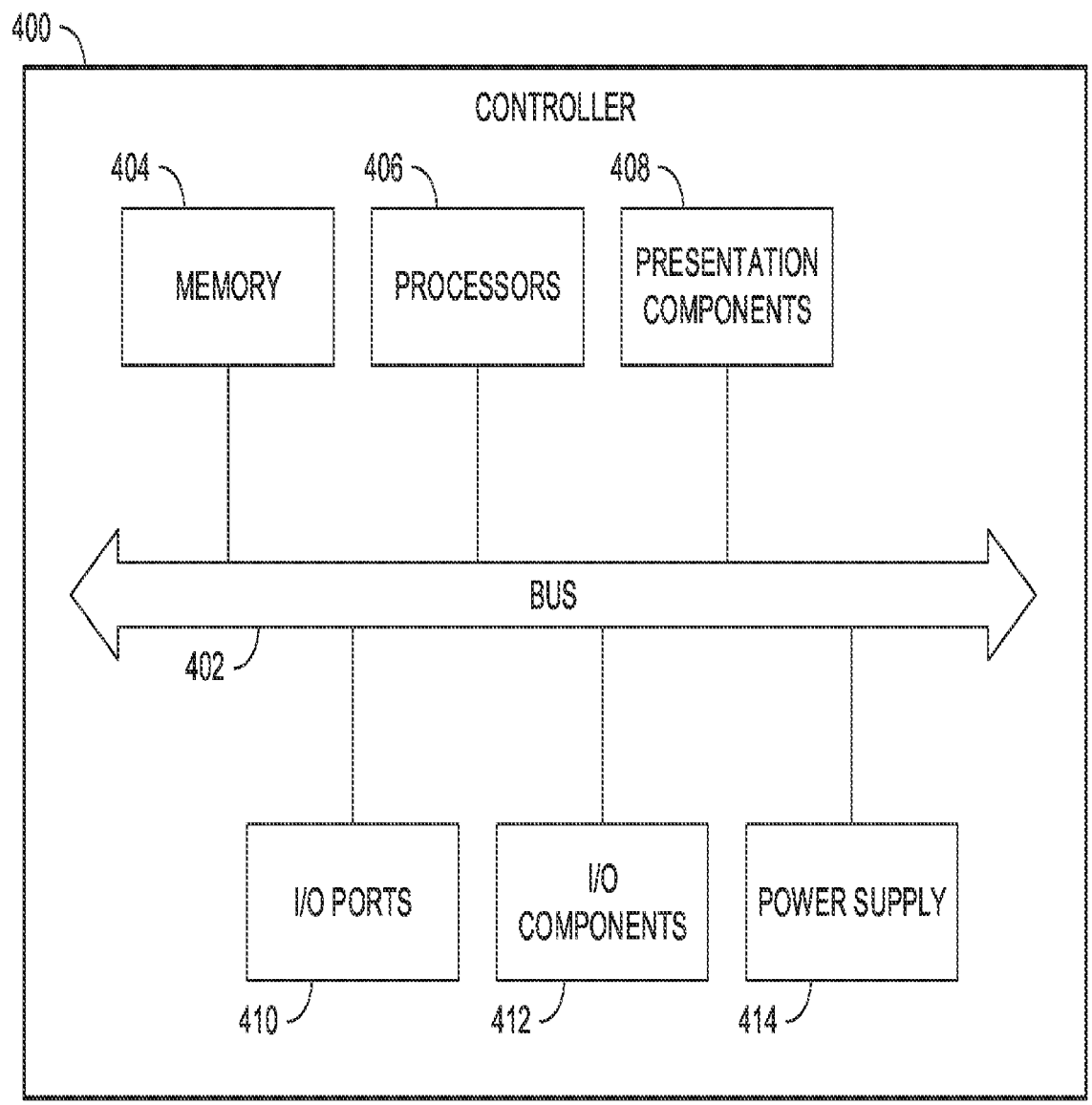
FIG. 4 is a computing device suitable for use as the controller of FIG. 3, in accordance with an embodiment described herein.

Computing device 400 of FIG. 4 is one example of a suitable computing environment and is not intended to suggest any limitation as to the scope of use or functionality of the technology. Neither should computing device 400 be interpreted as having any dependency or requirement relating to any one or combination of components illustrated.

Aspects of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including handheld devices, consumer electronics, general-purpose computers, more specialty computing devices, etc. The technology may also be practiced in distributed computing environments where tasks are performed by remote-processing devices that are linked through a communications network.

With continued reference to FIG. 4, computing device 400 includes bus 402 that directly or indirectly couples the following devices: memory 404, one or more processors 406, one or more presentation components 408, input/output ports 410, input/output components 412, and power supply 414.

Bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 4 merely illustrates an example computing device that can be used in connection with one or more embodiments of air conditioning systems. Distinction is not made between such categories as "workstation," "server," "laptop," "hand-held device," etc., as all are contemplated within the scope of FIG. 4 and reference to "computing device."

Computing device 400 typically includes a variety of computer-readable media. Computer-readable media can be any available media that can be accessed by computing device 400 and includes both volatile and nonvolatile media, and removable and non-removable media. By way of example, and not limitation, computer-readable media may comprise computer storage media and communication media.

Computer storage media includes volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 400. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 404 includes computer storage media in the form of volatile or nonvolatile memory. The memory may be removable, non-removable, or a combination thereof. Example hardware devices include solid-state memory, hard drives, optical-disc drives, etc. Computing device 400 includes one or more processors 406 that read data from various entities such as memory 404 or I/O components 412. Presentation component(s) 408 present data indications to a user or other device. Examples of presentation components include a display device, speaker, printing component, vibrating component, etc.

I/O ports 410 allow computing device 400 to be logically coupled to other devices including I/O components 412, some of which may be built in. Illustrative components include a microphone, joystick, game pad, satellite dish, scanner, printer, wireless device, and so forth.

Power supply 414 illustrates any power supply terminal or power source sufficient for providing power to one or more components of computing device 400.

Having described an example system suitable for use as controller 302, reference is again made back to operating environment 300. As illustrated, controller 302 is coupled to various components. While some components are illustrated as directly coupled to controller 302 and other are illustrated as coupled via network 304, it will be understood that this arrangement is just one example. Other arrangements are contemplated, and it should generally be understood that controller 302 may be communicatively coupled to any component indirectly via a network, such as network 304 or through a hardwire communication bus. Further, as noted, embodiments of the technology may comprise additional or fewer components. Some components may be combined with other components, and may be in any local or distributed arrangement.

As illustrated, controller 302 communicates via network 304 to a network of third-party servers 306. Such third-party servers 306 represent any server to which controller 302 communicates or from which controller 302 receives information. The Internet provides an example of connected servers that can exchange information with controller 302.

In one particular example, a third-party weather server, such as one accessed via the Internet, provides RH levels of ambient air that may be used by component of an air conditioning system to mix the ambient air with headspace air to achieve an air mixture having a target RH level. In another example, a third-party server represents a remote weather monitoring station.

Controller 302 is also illustrated as communicatively coupled to client computing device 308 via network 304. In general, client computing device 308 may be any computing device from which controller 302 receives information or communicates information regarding the air conditioning system. Computing device 400 of FIG. 4 is an example computing device that is suitable for use as client computing device 308. As an example, client computing device 308 may provide controller 302 with information related to the agricultural product within a grain bin. For instance, client computing device 308 may provide an indication of a type of agricultural product within a grain bin, a harvest date, a harvest location, a distribution date, a target moisture content, a target RH level, and the like.

In some embodiments, a client computing device may provide a schedule of activities associated with the agricultural product, such as when the agricultural product is placed within the grain bin and when the agricultural product will be distributed. From such information, controller 302 may determine the moisture contents, using the charts above as an example, and automatically adjusting target RH levels of air mixtures to achieve the target moisture content for the scheduled activities.

Network 304 may include one or more networks (e.g., public network or virtual private network "VPN") as shown with network 304. Network 304 may include, without limitation, one or more local area networks (LANs) wide area networks (WANs), or any other wired or wireless communication network or method.

Controller 302 is further illustrated coupled to datastore 310. Datastore 310 generally stores information including data, computer instructions (e.g., software program instructions, routines, or services), or models used in embodiments of the described technologies, or other information or instructions usable by controller 302 or other components of air conditioning system, such as those in operating environment 300. Although depicted as a single database component, datastore 310 may be embodied as one or more data stores or may be in the cloud.

Operating environment 300 comprises other components communicatively coupled to controller 302, including first sensor 312, second sensor 314, third sensor 316, headspace air valve 322, ambient air valve 324, humidifier 326, heater 328, sensor cable 330, and fan 332.

In general, controller 302 receives RH level information from sensors including first sensor 312, second sensor 314, and third sensor 316. First sensor 312 may be positioned within an air conditioning system or grain bin to measure a first RH level, among other variables, associated with headspace air. Second sensor 314 may be positioned such that it measures a second RH level, among other variables, associated with ambient air located outside of the grain bin. Third sensor 316 may be positioned within an air conditioning system or grain bin to measure a third RH level, among other variables, associated with an air mixture comprising the headspace air and ambient air. Each respective sensor may communicate values of measured variables, such as RH levels, to controller 302.

Headspace air valve 322 and ambient air valve 324 are generally coupled to controller 302 such that controller 302 operationally controls headspace air valve 322 and ambient air valve 324. Headspace air valve 322 and ambient air valve 324 may be controlled by controller 302 using one or more drivers stored in datastore 310. As an example, controller 302 may provide a signals causing actuation of actuators that respectively position the valves of headspace air valve 322 and ambient air valve 324. Such actuation can be binary, in the sense the controller 302 sends a data signal causing headspace air valve 322 and ambient air valve 324 to actuate between a closed position and an open position. The closed position of headspace air valve 322 may prevent headspace airflow through a headspace air supply line, whereas the open position of headspace air valve 322 may permit headspace airflow through the headspace air supply line. The closed position of ambient air valve 324 may prevent ambient airflow through an ambient air supply line, whereas the open position of ambient air valve 322 may permit ambient airflow through the ambient air supply line.

In another embodiment, headspace air valve 322 and ambient air valve 324 may be adjusted to a partially open position that respectively reduces headspace airflow and ambient airflow based on the partially open position. In an example embodiment, controller 302 further controls the headspace airflow rate and the ambient airflow rate respectively adjusting a degree of openness for headspace air valve 322 and ambient air valve 324. In one particular example, controller 302 turns on headspace air valve 322 and ambient air valve 324, and controls the headspace airflow rate and the ambient airflow rate using the degree of openness of headspace air valve 322 and ambient air valve 324. Controller 302 may independently control the operation of each headspace air valve 322 and ambient air valve 324, thereby controller a relative proportion of the amount of headspace air and ambient air, respectively, that is pas sed through the system.

Any combination of control of headspace air valve 322, and ambient air valve 324 by controller 302 to modify the headspace airflow rate and the ambient airflow rate to achieve any ratio is contemplated and is intended to be within the scope of the present disclosure.

Operating environment 300 further comprises humidifier 326. Humidifier 326 is coupled to controller 302 such that controller 302 operationally controls an amount of water humidifier 326 injects into the air, such as headspace air along the headspace air supply line, for example. Controller 302 may control humidifier 326 using one or more drivers stored on datastore 310.

In an example, controller 302 modifies the amount of water injected into the air by humidifier 326 based on RH level information received from the RH sensors, such as first RH sensor 312, second RH sensor 314, and third RH sensor 316. In a specific implementation, controller 302 receives a first RH level associated with headspace air from first RH sensor 312. Controller 302 accesses a target RH level. Controller 302 compares the first RH level with the target RH level and determines the target RH level is greater than the first RH level of the headspace air. Based on this determination, controller 302 modifies the amount of water injected into received headspace air until the headspace air is about equal to or equal to the target RH level.

Operating environment 300 further comprises heater 328. Heater 328 is coupled to controller 302 such that controller 302 operationally controls heater 328 by adjusting a heat level at which heater 328 heats air within the air conditioning system, such as a heat level at which heater 328 heats an air mixture, for example. Controller 302 may control heater 328 using one or more drivers stored in datastore 310.

By way of an example, controller 302 may modify a heat level of heater 328 based on information received from sensors, such as levels received from first sensor 312, second sensor 314, and third sensor 316. For instance, controller 302 receives a second RH level associated with ambient air from second RH sensor 314. In another case, controller 302 receives the second RH level from a third-party server, such as a weather server associated with third-party servers 306, via network 304. Controller 302 accesses a target RH level. Controller 302 compares the second RH level with the target RH level and determines the target RH level is less than the first RH level of the ambient air. Based on the determination, controller modifies the heat level of heater 328 to increase an air temperature until the RH level of the air, such as an air mixture comprising the ambient air, decreases and is about equal to or equal to the target RH level.

Operating environment 300 further comprises sensor cable 330. Sensor cable 330 is communicatively coupled to controller 302 such that controller 302 receives data from sensor cable 330 associated with variables measured by sensor cable 330, such as temperature and RH levels. For instance, controller 302 may receive a RH level from sensor cable 330, which can be used to determine a moisture content for an agricultural product. Controller 302 may adjust any of the components of operating environment 300 based on the data received from sensor cable 330.

Operating environment 300 further comprises fan 332. Fan 332 is coupled to controller 302 such that controller 302 operationally controls fan 332. Controller 302 may control fan 332 using one or more drivers stored on datastore 310. In some cases, controller 302 has binary control over fan 332, meaning the controller 302 can modify an on off state of fan 332, where fan 332 facilitates air movement through the air conditioning system when in the on state, and does not facilitate air movement through the air conditioning system in the off state. In other embodiments, controller 302 modifies a fan speed associated with fan 332 to adjust the volume of air moved through the air conditioning system by fan 332. As an example, when operationally mixing headspace air and ambient air, or otherwise operationally using humidifier 326 or heater 328, or other components of operating environment 300, controller 302 may turn on fan 332, or modify a fan speed of fan 332, to facilitate air movement, such as an air mixture, through the air conditioning system and into a grain bin.

Figure 5:
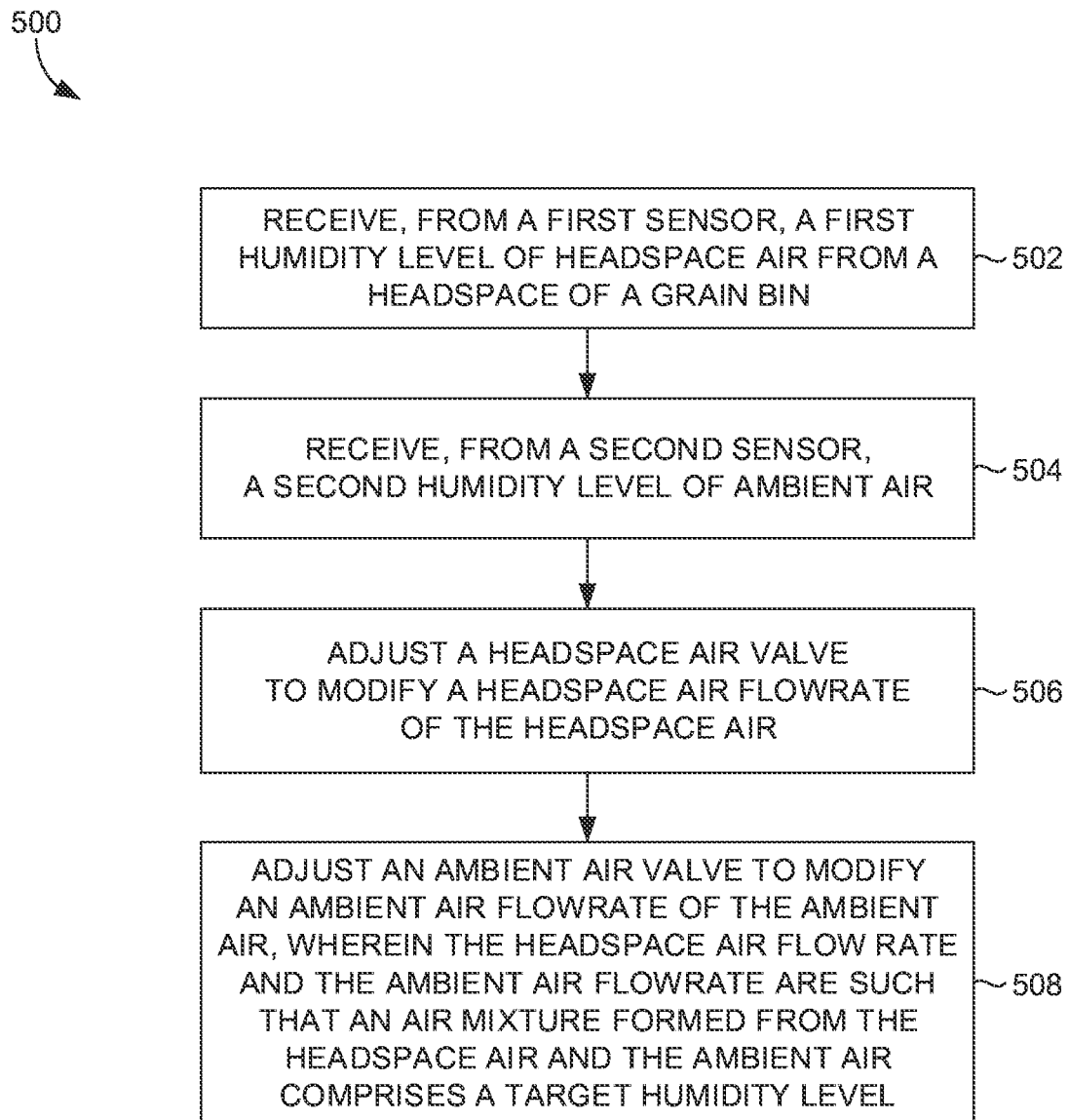
FIG. 5 is a block diagram illustrating operations that can be performed by the controller of FIG. 3, in accordance with an embodiment described herein.

With reference to FIG. 5, a block diagram is provided to illustrate a method for conditioning air using an air conditioning system. The method may be performed using an air conditioning system, such as air conditioning system 100 of FIG. 1 under the guidance of a controller, such as controller 302 of FIG. 3, having operational control of one or more components of operating environment 300. In embodiments, one or more computer storage media having computer-executable instructions embodied thereon that, when executed, by one or more processors, cause the one or more processors to perform the methods of regulating moisture content of an agricultural product within a grain bin. The methods may further be embodied or performed by a system comprising at least one processor executing the instructions embodied on the computer storage media.

At block 502, a first RH level is received from a first sensor. The first RH level is associated with headspace air from a headspace of a grain bin. The first RH level may be measured by the first sensor and communicated from the first sensor to a controller, where the controller receives the data from the first sensor indicating the first RH level.

At block 504, a second RH level is received from a second sensor. The second RH level is associated with ambient air. In some cases, the second RH level is received from a third-party weather server via a network or from a remote weather monitoring station. The second RH level may be measured by the second sensor and communicated from the second sensor to the controller, where the controller receives the data from the second sensor indicating the second RH level.

At block 506, a headspace air valve is adjusted. The headspace air valve may facilitate moving headspace air from within the headspace of the grain bin, along a headspace air supply line, and to a mixer of the air conditioning system. Adjustment of the headspace air valve causes a modification of a headspace airflow rate of the headspace air through the headspace air supply line. The controller may adjust the headspace air valve. In some cases, a degree to which the headspace air value is open (a percentage of an opening modified by headspace air valve) is adjusted to modify the headspace airflow rate.

The headspace air valve may be modified based on receiving RH levels from first sensor, the second sensor, or the third sensor, and based on a target RH level of an air mixture comprising the headspace air.

The target RH level can be determined by the controller based on accessing stored data, such as a type of agricultural product within the grain bin; an activity associated with the agricultural product, such as storage or distribution; a moisture content of the agricultural product in the grain bin, as determined, for example, by a cable sensor measuring variables such as temperature and RH levels; or any combination thereof. In a specific example, the moisture content of the agricultural product located in a lower one-half region of the grain bin is determined based on temperature or RH measurements from the sensor cable, and the headspace air valve is adjusted based on the moisture content of the agricultural product located in a lower one-half region of the grain bin.

At block 508, an ambient air valve is adjusted. The ambient air valve may facilitate moving ambient air along an ambient air supply line to a mixer of the air conditioning system. Adjustment of the ambient air valve causes a modification of an ambient airflow rate of the ambient air through the ambient air supply line. The controller may adjust the ambient air valve. In some cases, a degree to which the ambient air value is open (a percentage of an opening modified by ambient air valve) is adjusted to modify the ambient airflow rate.

The ambient air valve may be modified based on receiving RH levels from the first sensor, the second sensor, or the third sensor, and based on a target RH level of an air mixture comprising the ambient air.

In a specific implementation, the controller determines that the first RH level of the headspace air is greater than the second RH level of the ambient air. Based on this, the headspace air valve and the ambient air valve are adjusted such that the air mixture comprising the headspace air and the ambient air has a RH level that is equal to or about equal to the target RH level.

In a specific example, the moisture content of the agricultural product located in a lower one-half region of the grain bin is determined based on temperature and RH measurements from the sensor cable, and the ambient air receiving valve is adjusted based on the moisture content of the agricultural product comprised within in a lower one-half region of the grain bin. Specifically, the agricultural product located within a vertical layer corresponding to a lowermost sensor of the sensor cable is determined. In implementations, both the headspace air valve and the ambient air valve, in combination with any other components of the air conditioning system, are adjusted based on the moisture content of the agricultural product located in a lower one-half region of the grain bin. Specifically, the air conditioning system may be operated, e.g., a determination may be made whether to hydrate or dehydrate the agricultural product based on the moisture content of the agricultural product measured by the sensors, such as the lowermost sensor of the sensor cable. In operation, air conditioning system can be operational until the target moisture content is achieved. The target RH can be selected or calculated as indicated previously, and mixed air comprising this target RH may be blown into the grain bin plenum until the target moisture contents is achieved.

Each of the headspace airflow rate and the ambient airflow rate may be modified such that an air mixture, mixed by the mixer, comprising the headspace air and the ambient air has a RH level equal to or about equal to the target RH level. In a particular example, the target RH level is measured in RH and is from about 55% to about 65%, whereas in some cases the RH of the target RH level is from 55% to 65%. One method of determining the percentage opening of the headspace air valve and the ambient air valve to modify the values to achieve a target RH level uses the following equation: (Ambient Air RH)(1-x)+(Headspace Air RH)(x) =Target Humidity Level. "x" is the percentage opening of the headspace air valve and can be solved for using the preceding equation. The percentage opening of the ambient air valve is then 1-x. The headspace air valve and the ambient air valve can be modified accordingly to achieve the determined ratio of respective openings and generate an air mixture with the target RH level.

In implementations of the technology, the headspace airflow rate is controlled by a headspace air valve. The controller may adjust the headspace air valve to achieve an air mixture of the target RH level. In some cases, the ambient airflow rate is controlled by an ambient air valve. The controller may adjust the ambient air valve to achieve the air mixture of the target RH level.

Where the air mixture, as measured by the third sensor, comprises a RH level that is less than the target RH level, the controller may further activate a humidifier to inject additional water into the air. The humidifier may inject the water to into a headspace air supply line, an ambient air supply line, or an air mixture supply line, based on the location of the humidifier within the air conditioning system. In a specific example, the controller causes the humidifier to inject additional water into headspace air along headspace air supply line. The humidifier injects water in an amount such that the air mixture has a RH level about equal to or equal to the target RH level.

Where the air mixture, as measured by the third sensor, comprises a RH level that is more than the target RH level, the controller may further activate a heater to increase the temperature of air within the air conditioning system. The heater may increase the temperature of headspace air, ambient air, or an air mixture respectively flowing along the headspace air supply line, the ambient air supply line, or the air mixture supply line, based on the location of the heater within the air conditioning system. In a specific example, the controller causes the heater to increase the temperature of the air mixture along the air mixture supply line. The heater heats the air to a temperature such that the air mixture has a RH level about equal to or equal to the target RH level.

Examples

Example 1: Soybeans are placed into a grain bin of size 36 ft. (foot) (10.97 m) diameter and 25 ft. (7.62 m) eave height and filled to the eave for storage and condition. The bin is equipped with a 30 hp (horsepower) (22.4 kW) (kilo watt) speed 1750 rpm (rotations per minute) centrifugal fan, which gives around 1.07 cfm/bu (cubit feet per minute of air per bushel) or 1.177 m³/min·t (cubic meter per min per ton) and develop 5.5 in. (14 cm) of water static pressure (SP). As a rule of thumb, 5.5 in. of SP develop a 5.5° F. temperature rise in the plenum, which could reduce 8-10% RH, corresponding to 1.5-2% moisture based on EMC characteristics. The soybeans have an initial moisture content of 16%. For storage, the target moisture content is 13±A fan pulling from an ambient air source is turned on, and ambient air is introduced to the soybean to begin the drying process. When soybeans within the bottom 3 ft. depth of grain mass achieved a moisture content of 13±1%, the air conditioning system is activated. When the ambient air EMC is about 12%, plenum air EMC would be about 10% based on heat of compression, also called fan warm. The air conditioning system is activated and pulls headspace air from the headspace of the grain bin to increase the plenum air from 10% to 12.5-13.5% RH. Using a sensor, the relative RH of the headspace air was determined to be 80% (16% EMC). Using another sensor, the relative RH of the ambient air was determined to be 12% and calculated plenum EMC is 10% based on heat of compression. A target RH level the air conditioning system was determined to be 13%. The heat of compression of 5.5° F. reduced the plenum air EMC to 2% lower than ambient air. To find the opening percentage for headspace air valve and ambient air valve, the following formula was used: 50% (X1)+80% (X2)=65%. By changing the X1 and X2 values by iteration, the correct values of X1=55% and X2=45% were determined. By opening headspace air valve 55% and ambient air valve 45%, 65.75% RH at the plenum was achieved. The mixed air was provided into the grain bin for drying the soybeans. For conversion purposes, 1 cfm/bu=1.1 m³/(min·t)

Example 2: Similar to Example 1, however, bottom layer moisture was 13% and ambient air EMC was 16%. In this example, headspace valve was closed and only ambient air valve was opened. The heater was operated to bring down 16% EMC to 13% EMC (85% RH to 65% RH).

Example 3: Similar to Example 1, however, hydration of soybean was performed, as all the layers including bottom layer were over-dried to 10% from the field. The hydration was performed to 13% moisture. In this Example, ambient air RH is 95% (18% EMC) became 85% (16% EMC) at the plenum and headspace air of 50% RH (10% EMC). Headspace valve was opened at 55% and ambient air valve opened at 45%. This resulted in a mixed air having 65% RH (13% EMC).

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

For purposes of this disclosure, the word "including" or "having," or derivatives thereof, has the same broad meaning as the word "comprising," and the word "accessing," or derivatives thereof, comprises "receiving," "referencing," or "retrieving." Further, the word "communicating," or derivatives thereof, has the same broad meaning as the word "receiving," or "transmitting" facilitated by software or hardware-based buses, receivers, or transmitters using communication media.

From the foregoing, it will be seen that this technology is one well adapted to attain all the ends and objects described above, including other advantages which are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects that can be practiced from the forgoing description include:

Aspect 1: A computerized method, computer storage media, or a controller comprising at least one processor; and computer storage media storing computer-readable instructions that, when executed by the at least one processor, cause the processor perform operations for regulating moisture content of an agricultural product within a grain bin. The method, media, or controller comprises, instructs, or performs operations comprising: receiving, from a first sensor, a first RH level of headspace air from a headspace of a grain bin; receiving, from a second sensor, a second RH level of ambient air; adjusting a headspace air valve to modify a headspace airflow rate of the headspace air; and adjusting an ambient air valve to modify an ambient airflow rate of the ambient air, wherein the headspace airflow rate and the ambient airflow rate are such that an air mixture formed from the headspace air and the ambient air comprises a target RH level.

Aspect 2: Aspect 1, wherein the target RH level comprises a relative RH in a range from about 55% to about 65%.

Aspect 3: Any of Aspects 1-2, further comprising injecting, via a humidifier, water into the headspace air based on the first RH level of the headspace air.

Aspect 4: Any of Aspects 1-3, further comprising accessing a target moisture content of an agricultural product stored within the grain bin, and determining the target RH level based on the target moisture content.

Aspect 5: Any of Aspects 1-4, further comprising receiving, from a RH sensor located within 3' of the bottom layer grain mass an indication that an agricultural product comprises a target moisture content, wherein the headspace air receiving valve and the ambient air receiving valve openings are adjusted in response to the indication of the target moisture content of the agricultural product.

Aspect 6: Any of Aspects 1-5, further comprising determining that the first RH level of the headspace air is greater than the second RH level of the ambient air, wherein the headspace air receiving valve and the ambient air receiving valve openings are adjusted in response to determining the first RH level of the headspace air is greater than the second RH level of the ambient air.

Aspect 7: Any of Aspects 1-6, further comprising opening a headspace air valve based on first RH level of headspace air, and opening an ambient air valve based on the second RH level of the ambient air value, wherein the headspace air valve permits headspace air to enter a mixer and the ambient air valve permits ambient air to enter the mixer.

Aspect 8: An air conditioning system for regulating moisture content of an agricultural product in a grain bin, the system comprising: a headspace air supply line having a headspace air receiving end configured to receive headspace air from a grain bin; an ambient air supply line having an ambient air receiving end configured to receive ambient air; a mixer comprising a mixing area that receives headspace air from the headspace air supply line and the ambient air from the ambient air supply line; and a mixed air supply line that receives an air mixture from the mixer and provides the air mixture to a location within the grain bin.

Aspect 9: Aspect 8, further comprising a first RH sensor located within the headspace air supply line, the first RH sensor measuring a first RH level of the headspace air.

Aspect 10: Any of Aspects 7-9, further comprising a second RH sensor located outside of the grain bin, the second RH sensor measuring a second RH level of the ambient air.

Aspect 11: Any of Aspects 7-10, further comprising a third RH sensor located within the mixed air supply line, the third RH sensor measuring a third RH level of the air mixture.

Aspect 12: Any of Aspects 7-11, further comprising a humidifier coupled to a water source, wherein the humidifier injects water into the headspace air supply line.

Aspect 13: Any of Aspects 7-12, further comprising an air heater along the air mixture supply line.

Aspect 14: Any of Aspects 7-13, further comprising: a headspace air value along the headspace air supply line, the headspace air valve regulating entry of the headspace air into the mixer; and an ambient air valve along the ambient air supply line, the ambient air valve regulating entry of the ambient air into the mixer.

Aspect 15: A method of regulating moisture content in an agricultural product stored in a grain bin, the method comprising: receiving headspace air from a headspace of a grain bin comprising an agricultural product; receiving ambient air; mixing the headspace air with the ambient air to form an air mixture; and providing the air mixture to a location within the grain bin.

Aspect 16: Aspect 15, wherein the received headspace air has a first RH level and the received ambient air has a second RH level, the first RH level of the headspace air being greater than the second RH level of the ambient air.

Aspect 17: Any of Aspects 15-16, wherein the headspace air and the ambient air are mixed in a ratio, the ratio of headspace air to ambient air being determined by a target moisture content for an agricultural product within the grain bin.

Aspect 18: Any of Aspects 15-17, further comprising: determining a moisture content of an agricultural product in the grain bin; and providing the air mixture based on the moisture content of the agricultural product.

Aspect 19: Aspect 18, wherein the moisture content is determined for a portion of the agricultural product located within a lower one-half region of the grain bin.

Aspect 20: Any of Aspects 15-19, further comprising injecting water, using a humidifier, into the received headspace air based on a first RH level of the headspace air.

Aspect 21: Any of Aspects 15-20, further comprising: adjusting a headspace air valve to modify a headspace airflow rate; and adjusting an ambient air valve to modify an ambient airflow rate, wherein the headspace air valve and the ambient air valve are adjusted such that an air mixture of the headspace air and the ambient air is formed based on a moisture content of an agricultural product within the grain bin.

Aspect 22: Any of Aspects 15-21, wherein the air mixture has a target RH level comprising a relative RH in a range from about 55% to about 65%.

Aspect 23: A method of controlling RH for regulating a moisture content of an agricultural product, the method comprising: measuring, using a first RH sensor, a first RH level of headspace air received from a headspace of a grain bin; measuring, using a second RH sensor, a second RH level of ambient air; mixing the headspace air and the ambient air into an air mixture having a target RH level, wherein the headspace air and the ambient air are mixed based on the first RH level and the second RH level; and providing the air mixture to a location within the grain bin.

Aspect 24: Aspect 23, further comprising: adjusting a headspace airflow rate; and adjusting an ambient airflow rate, wherein the headspace airflow rate and the ambient airflow rate are adjusted such that the air mixture comprises the target RH level.

Aspect 25: Any of Aspects 23-24, wherein the target RH level is determined based on a target moisture content of an agricultural product within the grain bin.

Aspect 26: Any of Aspects 23-25, wherein the air mixture having the target RH level is provided to the location within the grain bin in response to a portion of agricultural product, located in a lower one-half region of the grain bin, reaching a target moisture content.

Aspect 27: Any of Aspects 23-26, further comprising injecting water, using a humidifier, into the received headspace air based on the first RH level of the headspace air.

What is claimed is:

1. An air conditioning system for a grain bin, the air conditioning system comprising:
   a headspace air supply line having a headspace air receiving end configured to receive headspace air from a grain bin, the headspace air supply line comprising a headspace air valve that regulates a rate at which the headspace air passes through the headspace air supply line;
   an ambient air supply line having an ambient air receiving end configured to receive ambient air, the ambient air supply line comprising an ambient air valve that regulates a rate at which the ambient air passes through the ambient air supply line; and
   a controller configured to operationally control the headspace air valve and the ambient air valve, wherein by controlling the headspace air valve, the controller modifies a headspace airflow rate, and by controlling the ambient air valve, the controller modifies an ambient airflow rate to form an air mixture that is determined based on an equilibrium moisture content of an agricultural product within the grain bin and a target grain moisture content to be achieved.

2. The air conditioning system of claim 1, wherein the air mixture comprises a ratio of ambient air to headspace air that is determined based on a current moisture content of the agricultural product and the target grain moisture content.

3. The air conditioning system of claim 1, further comprising a fan that receives the air mixture and exhausts the air mixture into a grain bin plenum.

4. The air conditioning system of claim 1, wherein:
   the controller modifies the headspace airflow rate by controlling a degree of openness of the headspace air valve; and
   the controller modifies the ambient airflow rate by controlling a degree of openness of the ambient air valve.

5. The air conditioning system of claim 1, further comprising a first RH (relative humidity) sensor communicatively coupled to the controller and positioned to measure an RH of the headspace air, wherein the headspace airflow rate is controlled by the controller based on the RH of the headspace air.

6. The air conditioning system of claim 1, further comprising a second RH sensor positioned in a lower one-half region of the grain bin, wherein the controller modifies the headspace airflow rate based on an RH measured by the second RH sensor.

7. The air conditioning system of claim 1, further comprising a humidifier positioned along the headspace air supply line, the humidifier communicatively coupled to the controller and configured to inject water into the headspace air within the headspace air supply line.

8. An air conditioning system for a grain bin, the air conditioning system comprising:
   a headspace air supply line having a headspace air receiving end configured to receive headspace air from a grain bin;
   a headspace air valve that regulates a rate at which the headspace air passes through the headspace air supply line; and
   a controller configured to operationally control the headspace air valve, wherein by controlling the headspace air valve, the controller modifies a headspace airflow rate of headspace air entering a mixer comprising ambient air, and wherein modifying the headspace airflow rate forms an air mixture of headspace air and ambient air that is determined based on an equilibrium moisture content of an agricultural product within the grain bin and a target grain moisture content to be achieved.

9. The air conditioning system of claim 7, wherein the air mixture comprises a ratio of ambient air to headspace air that is determined based on a current moisture content of the agricultural product and the target grain moisture content.

10. The air conditioning system of claim 7, further comprising a fan that receives the air mixture and exhausts the air mixture into a grain bin plenum.

11. The air conditioning system of claim 7, wherein the controller modifies the headspace airflow rate by controlling a degree of openness of the headspace air valve.

12. The air conditioning system of claim 7, further comprising a first RH (relative humidity) sensor communicatively coupled to the controller and positioned to measure an RH of the headspace air, wherein the headspace airflow rate is controlled by the controller based on the RH of the headspace air.

13. The air conditioning system of claim 7, further comprising a second RH sensor positioned in a lower one-half region of the grain bin, wherein the controller modifies the headspace airflow rate based on an RH measured by the second RH sensor.

14. The air conditioning system of claim 7, further comprising a humidifier positioned along the headspace air supply line, the humidifier communicatively coupled to the controller and configured to inject water into the headspace air within the headspace air supply line.

15. An air conditioning system for a grain bin, the air conditioning system comprising:
   a headspace air supply line having a headspace air receiving end configured to receive headspace air from a grain bin, the headspace air supply line comprising a headspace air valve that regulates a rate at which the headspace air passes through the headspace air supply line;

a mixer receiving the headspace air from the headspace air supply line and ambient air from an ambient air supply line; and a controller configured to operationally control the headspace air valve, wherein by controlling the headspace air valve, the controller modifies a headspace airflow rate of headspace air into the mixer to form an air mixture with the ambient air, the air mixture being determined based on an equilibrium moisture content of an agricultural product within the grain bin and a target grain moisture content of the agricultural product, and the air mixture exhausted into a plenum of the grain bin.

16. The air conditioning system of claim 14, wherein the air mixture comprises a ratio of ambient air to headspace air that is determined based on a current moisture content of the agricultural product and the target grain moisture content.

17. The air conditioning system of claim 14, wherein the controller modifies the headspace airflow rate by controlling a degree of openness of the headspace air valve.

18. The air conditioning system of claim 14, further comprising a first RH (relative humidity) sensor communicatively coupled to the controller and positioned to measure an RH of the headspace air, wherein the headspace airflow rate is controlled by the controller based on the RH of the headspace air.

19. The air conditioning system of claim 14, further comprising a second RH sensor positioned in a lower one-half region of the grain bin, wherein the controller modifies the headspace airflow rate based on an RH measured by the second RH sensor.

20. The air conditioning system of claim 14, further comprising a humidifier positioned along the headspace air supply line, the humidifier communicatively coupled to the controller and configured to inject water into the headspace air within the headspace air supply line.

* * * * *